United States Patent [19]

Morioka

[11] Patent Number: 4,703,247

[45] Date of Patent: Oct. 27, 1987

[54] BATTERY APPARATUS FOR AN ELECTRIC SHAVER

[75] Inventor: Toru Morioka, Hyogo, Japan

[73] Assignee: Sanyo Electric Co., Ltd., Japan

[21] Appl. No.: 886,181

[22] Filed: Jul. 16, 1986

[30] Foreign Application Priority Data

Jul. 19, 1985 [JP] Japan ............................ 60-160710
Sep. 17, 1985 [JP] Japan ............................ 60-204853

[51] Int. Cl.$^4$ .............................................. H02J 7/10
[52] U.S. Cl. ............................................ 320/13; 320/40
[58] Field of Search ................ 320/13, 40; 307/64, 307/66

[56] References Cited

U.S. PATENT DOCUMENTS

| | | | |
|---|---|---|---|
| 3,395,288 | 7/1968 | Von Brimer | 320/40 X |
| 3,409,802 | 11/1968 | Savage | 320/40 X |
| 3,474,296 | 10/1969 | Rickey | 320/40 X |
| 3,975,670 | 8/1976 | McDermott | 320/18 X |
| 4,342,953 | 8/1982 | Collins | 320/13 |

Primary Examiner—R. J. Hickey
Attorney, Agent, or Firm—Darby & Darby

[57] ABSTRACT

An apparatus which is capable of providing an advance warning for indicating excessive discharge of a battery, during the supply of electric power from the battery to a load, prior to the battery being unuseable for powering the load. The apparatus comprises first power supplying means for initially supplying power from the battery to the load, supervisory control means for continuously monitoring the residual or current power capacity of the battery and interrupting or reducing the supply of power to the load when a predetermined quantity of power consumption is detected, and second power supplying means for supplying, subsequently, the residual power of the battery to the load when the first power supplying means is rendered inoperative.

5 Claims, 8 Drawing Figures

BATTERY APPARATUS FOR AN ELECTRIC SHAVER

The present invention relates to a power supplying battery apparatus, and more specifically to a power supplying battery apparatus suitable for an electric source of battery operated electric devices such as an electric shaver or the like, which is capable of providing an advance warning indicating the depletion of the residual power capacity of the battery.

BACKGROUND OF THE INVENTION

When a battery of a battery operated device such as an electric shaver, portable radio or TV, desk cleaner or the like has run down unexpectedly, the user of such device will be disadvantaged. This is especially true if the battery has run down unexpectedly under circumstances where the user does not have a spare battery or charging equipment, or when the user is shaving just before going out.

In order to obviate the situation such as described above, various proposals have heretofore been presented. In the Japanese Patent Early Publication No. 59-136031 (1984), for example, there is disclosed an apparatus and a method for optically and/or acoustically indicating the charged state of a battery or a storage battery. The apparatus is capable of indicating under load free conditions, that the battery or the storage battery has discharged below a predetermined value. The predetermined value is set by taking into account that the battery or the storage battery is to be still at a level for supplying power to a load, for a nominal period of time. The additional provision for an inspection key or a manual switch to select a test position is unnecessary when the load current necessary to operate the apparatus is small.

Also, in the Japanese Patent Early Publication No. 59-106828 (1984), there is disclosed a signal indicator apparatus for indicating a specific charged state of a storage battery, wherein a memory circuit is provided to maintain a charge state indicator energized for a specific interval of time after a device using the storage battery as a power supply is switched off.

Further, in the Japanese Patent Early Publication No. 60-3875 (1985), there is disclosed a charging type, small-sized electric device comprising a power supply including first and second storage batteries, a load supplied power from the power supply, a change over switch for selectively connecting a first storage battery or a second one to the load, a charger for charging the power supply, and a plug for connecting the charger to a commercial AC power supply, wherein upon the application of power to the charger, a changeover switch is operated to select the first storage battery for charging.

Furthermore, in the Japanese Utility Model Early Publication No. 59-34447 (1984), there is disclosed a "RECORDER-REPRODUCER APPARATUS" comprising a casing containing a plurality of batteries, a connecting means for selectively connecting one of the batteries to a driving circuit, a detecting circuit for detecting that the voltage of the battery under use is lowered below a predetermined voltage level, an indicator for producing an alarm in response to an output signal from the detecting circuit, for indicating that the using battery should be changed, and a switching means for switching the connecting means so as to connect another battery to the driving circuit.

In apparatus in which a discharge state of a battery is alarmed or indicated by a light emitting diode or the like, however, the alarm or the indication tends to be overlooked. Such apparatus requires additional indicator or alarm means, and additional electric power to ensure operation thereof. On the other hand, in an apparatus in which a plurality of spare batteries are provided, a rather larger casing space for the batteries is required, resulting in increased costs.

SUMMARY OF THE INVENTION

It is an object of the invention to overcome the above described problems and to provide a power supplying battery apparatus which is able to positively indicate to the user the excess discharge of a battery, without requiring any additional indicator or alarm mechanisms.

It is another object of the invention to provide a power supplying battery apparatus which is capable of providing advance warning to a user, for indicating the power shortage or discharge of the battery.

It is another object of the invention to provide a power supplying battery apparatus which is capable of operating an electric device for a period of time after the user is informed that the battery has discharged to a predetermined level.

According to the present invention, there is provided a power supplying battery apparatus, wherein the total power capacity of the battery is divided into a main supply and a spare or auxiliary supply or power source, comprising a first power supplying means for supplying an amount of electric power corresponding to the main portion to a load, a supervisory control means for monitoring the residual power capacity of the battery, and changing the supply of power to the load when a predetermined level of power consumption is detected, and a second power supplying means for supplying power from the auxiliary supply to the load.

In a preferred embodiment of the power supplying battery apparatus, a detecting means is included to detect a predetermined voltage of a battery in a supervisory control means, indicating to a user that the main supply of the battery power has discharged to an unacceptable level.

Further, in the supervisory control means, it is preferred to provide an interrupting means to interrupt the supply of power to the load in response to a detecting means, whenever the voltage of the battery has discharged to a predetermined level. In this manner, an advance warning to the user is provided to indicate that the battery will soon discharge below a usable level. Also the advance warning may be embodied inexpensively without requiring any additional power draining indicators or alarms.

The interrupting means comprises a first switching means connected in series with the load, for terminating the supply of power to the load from the main supply when the associated battery discharges to a predetermined level.

Further, said second power supplying means may include a second switching means which connects said battery to supply power to the load during times of turn-off or de-energization of said first switching means. By operating the second switching means, the user of the device is able to operate the device for a period of time through the consumption of the spare power capacity of the battery. In this manner, the situation in which the operation of the device is impossible due to the complete discharge of the battery is temporarily obviated.

The supervisory control means may, alternatively, be provided, instead of the interrupting means, with a power reducing means to reduce, in response to the detecting means, the supply of power to the load, whenever the battery discharges to the predetermined level. In the latter case, since the power supplied to the load is reduced, when the main part of the power capacity of the battery has been discharged, the user may be informed without stopping operation of the device (via the power supplied from the spare portion of the battery) that the battery will soon be discharged below a useful level.

The reducing means may include a first switching means connected in series with the load. The reducing means is switched off when the voltage or charge of the battery attains a predetermined level. A voltage dropping means is connected in parallel with said first switching means. Further, it is preferable that the second power supplying means comprises a second switching means which operates to connect the battery to directly supply power to the load, bypassing the voltage dropping means at times that the first switching means is switched off.

DETAILED DESCRIPTION OF THE PREFERRED EMBODIMENTS

The invention will now be described by way of example for the case where the apparatus according to the invention is applied for use with an electric shaver.

Figure 1:
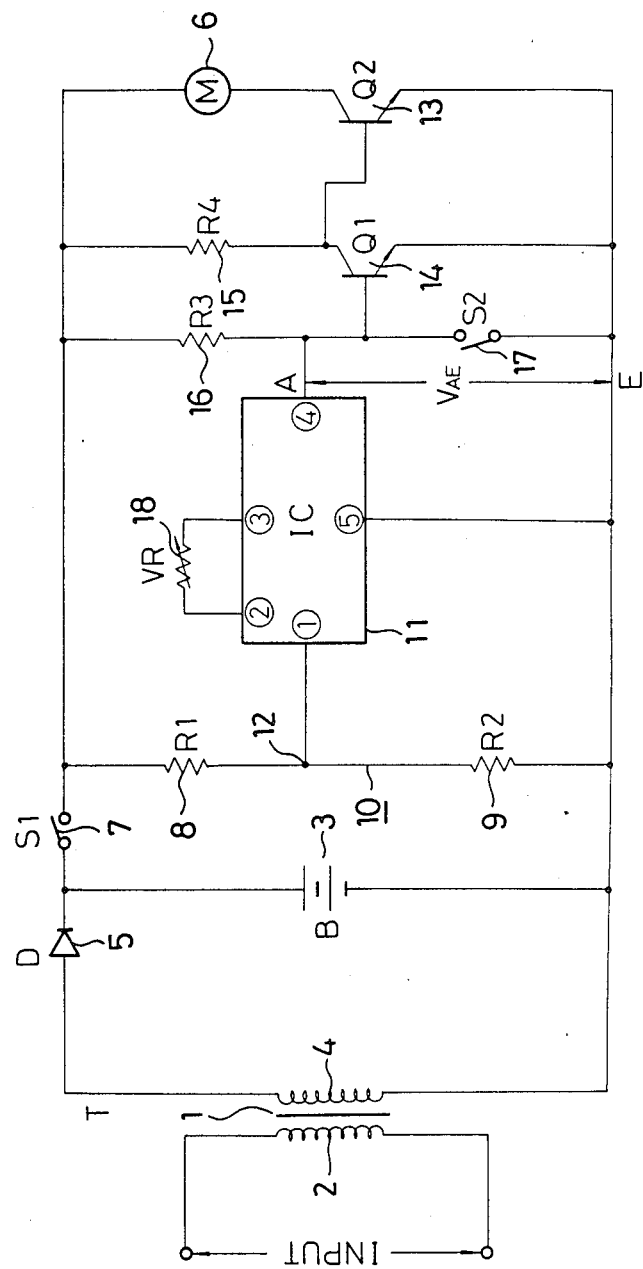
FIG. 1 is an electric circuit diagram of a power supplying battery apparatus according to an embodiment of the present invention.

As shown in FIG. 1, a primary coil 2 of a step-down transformer 1 is connected to a commercial AC power supply. A second coil 2 of the transformer 1 is connected through a rectifying diode 5 to a Ni-Cd battery 3. A resistance type voltage divider circuit 10 comprising resistors 8 and 9 is also connected in parallel with the battery 3 through a starting switch 7. Further, to the resistance type potential divider circuit 10, there are connected in parallel a series circuit of a resistor 16 and a normally-off type switch 17, a series circuit of a resistor 15 and a transistor 14, and a series circuit of a DC motor 6 and a transistor 13, respectively.

A midpoint 12 of the resistance type potential divider circuit 10 is connected to an input terminal 1 of an IC 11. An output terminal 4 of the IC 11 is connected to a junction between the resistor 16 and the normally-off type switch 17. The base of the transistor 14 is also connected to the junction. The collector of the transistor 14 is connected to the base of the transistor 13. In this example, the starting switch 7 serves as a first power supplying means to supply power from the battery 3 to the DC motor 6 as a load. The IC 11 is a detecting means for monitoring the voltage of the battery 3, and detecting when the voltage of the battery 3 is reduced to a predetermined level. The transistor 13 forms a first switching means for controlling application to or removal of power from the DC motor 6, in response to the output of the IC 11. Further, the normally-off type switch 17 forms a second switching means which when turned off forces the transistor 13 to switch on by applying a positive voltage to the base of transistor 13.

With the construction described above, for the case of charging the battery 3, by connecting the step-down transformer 1 to a commercial AC power supply while the starting switch 7 is switched off, an appropriate charging current is supply through the diode 5 for charging the battery 3.

For the case of operating the device (a motor 6, in this example), the step-down transformer 1 is disconnected from the commercial AC power supply. When the starting switch 7 is switched on, because of the high initial voltage of the battery 3, the IC 11 is not operated, whereby the output terminal 4 is held at a low level. Thus, the transistor 14 is cutoff, while the transistor 13 is turned on, causing power to be applied to the motor 6, which begins to rotate.

As the power is consumed, the voltage of the battery 3 is gradually reduced, as the battery 3 discharges. When the voltage level reduces to a predetermined level, the corresponding voltage at the midpoint 12 of the potential divider circuit 10 is applied to the IC 11 so that the output at the terminal 4 of the IC 11 changes state from a low to a high level. The transistor 14 is then turned on, causing the transistor 13 to turn off, removing power from the motor 6, which stops rotating. At this stage of operation, the residual power capacity of the battery 3 is only an amount sufficient to operate the device for a few cycles (for the case of the electric shaver, one cycle of operation lasts about three minutes).

The battery 3 may be recharged when the motor 6 is stopped. When the use of the device is next required, the motor 6 may be operated again by switching on the normally-off type switch 17 so that the transistor 14 is forced to turn off, whereby the transistor 13 is turned on again to apply power to the motor 6, for a brief period even if the battery 3 is only partially recharged.

Figure 2:
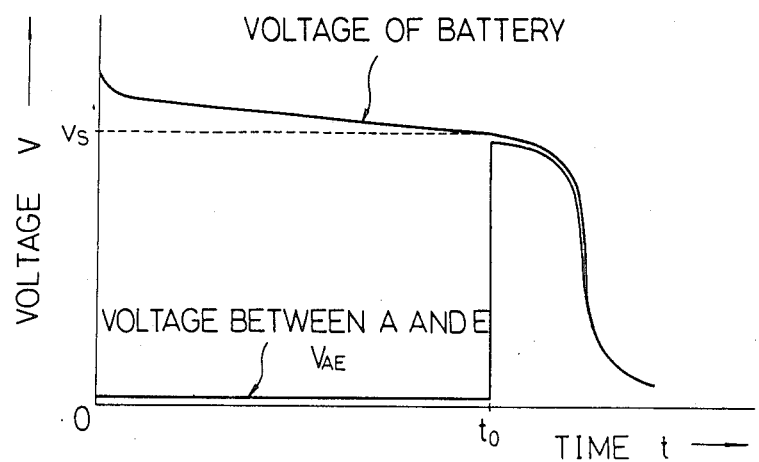
FIG. 2 is a characteristic diagram showing the time dependence of the voltage of the battery and that between A and E in FIG. 1, FIGS. 3 and 4 are electric circuit diagrams showing relevant parts, respectively, of other embodiments according to the present invention, each of which is an embodiment modified a part of FIG. 1.
Figure 3:
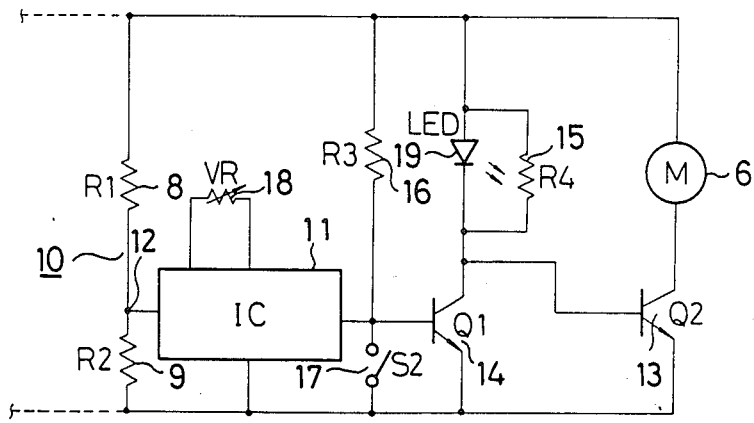

FIG. 3 is a characteristic diagram showing the time dependence of both the voltage of the battery 3, and the voltage $V_{AE}$ between A and E of FIG. 1, during the operation of the apparatus described above. As shown in FIG. 2, when the voltage of the battery attains a predetermined level $V_s$ at the time $t_o$, the output or voltage at the terminal 4 of the IC11 changes state from a low to high level, causing $V_{AE}$ to go high (switch 17 is open), in turn causing transistor 14 to turn on.

Figure 4:
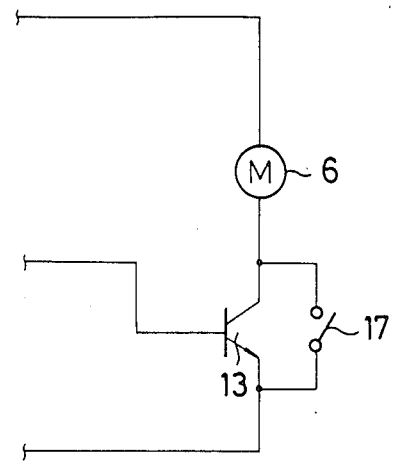

FIGS. 3 and 4 are modifications of the electric circuit shown in FIG. 1. In FIG. 3, a light emitting diode 19, connected in parallel with the resistor 15, is energized to emit light when the level of voltage of the battery 3 decreases to a predetermined level and the transistor 14 is turned on. The stopping of the motor 6 together with the lighting of the light emitting diode 19 indicates that only minimal power is left in the battery 3.

FIG. 4 shows another modification of the embodiment of FIG. 1, wherein the normally-off type switch 17 is connected between the collector and the emitter of the transistor 13.

Figure 5:
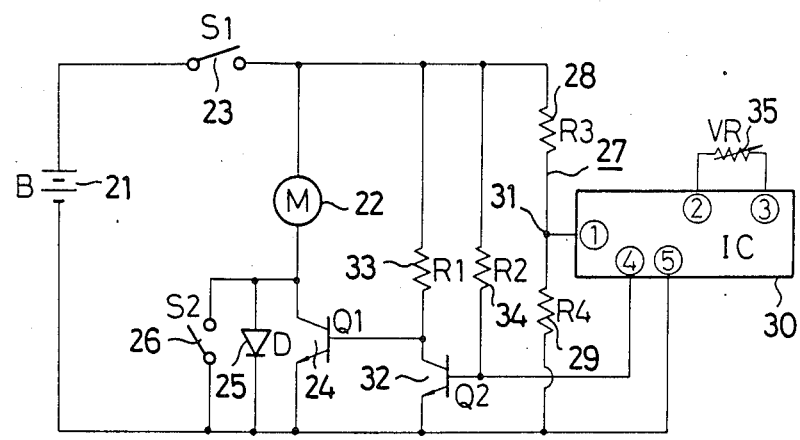
FIG. 5 is an electric circuit diagram of a power supplying battery apparatus showing another embodiment of the present invention.

FIG. 5 shows still another embodiment of the present invention, wherein a storage battery 21 such as a Ni-Cd battery, for example, may be connected to charging equipment. The storage battery 21 is connected through a starting switch 23 to a series circuit comprising a DC motor 22 as a load, and a transistor 24 as a first switching means for changing the rotational speed of the DC motor 22. The transistor 24 is also connected in parallel with a diode 25 serving as a voltage dropping means, and with a spare switch 26 providing a second switching means. A series circuit comprising a resistor 33 and a transistor 32, and a resistance type potential divider circuit 27 comprising resistors 28 and 29, are each connected in parallel with the series circuit comprising the DC motor 22 and the transistor 24. A midpoint 31 of the resistance type potential divider circuit 27 is connected to an input terminal 1 of an IC 30, serving as a detecting means for detecting the voltage of the storage battery 21. An output terminal 4 of the IC 30 is connected to the base of the transistor 32, while the collector of the transistor is connected to the base of the transistor 24.

Figure 6:
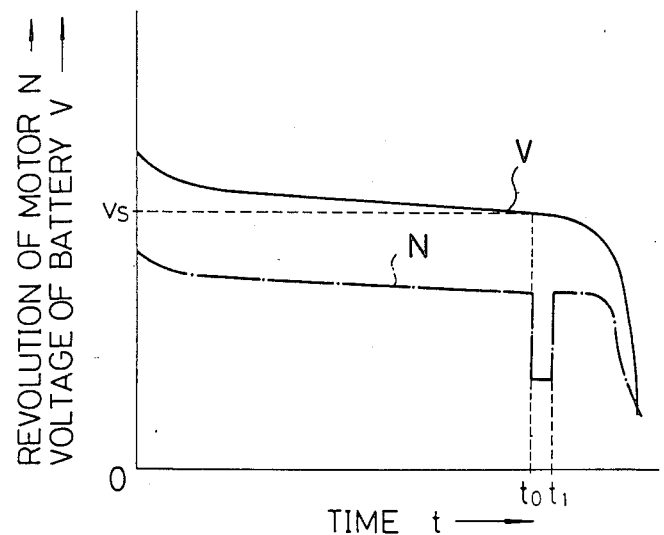
FIG. 6 is a diagram showing changes with passage of time for the voltage of a battery and the revolutions per minute of a motor in FIG. 5.

With the electric circuit having the construction described above, when the starting switch 23 is switched on, because of the high initial voltage of the battery 21 the IC 30 is not operated, causing the output terminal 4 to be held at a low level. Thus, the transistor 32 is turned off, while a base current is supplied to the transistor 24 through the resistor 33, causing transistor 24 to turn on. Accordingly, a drive voltage is applied through the transistor 24 to the motor 22 for driving the motor at a normal speed of rotation, as shown in FIG. 6. As the operation of the motor 22 is continued, the power of the battery 21 is gradually consumed, and the level of voltage of the battery 21 is correspondingly reduced. When the voltage of the battery 21 reduces to a predetermined level $V_s$ at a time $t_o$, corresponding to a residual power capacity of the battery 21 available for short term operation of a device such as motor 22, for example, a corresponding voltage at the midpoint 31 of the potential divider circuit 27 is applied to the input terminal 1 of the IC 30, which responds by changing the output voltage at terminal 4 from low to high level. The transistor 32 is then turned on as a result, in turn causing transistor 24 to turn off due to interruption of its base current. Accordingly, the voltage applied to the motor 22 is reduced, from the voltage $V_s$ of the battery 21 at this stage, by an amount corresponding to the voltage drop due to the resistance of the diode 25, causing the rotational speed of the motor 22 to decrease. At this stage, the residual power capacity of the battery 21 is only sufficient for operating the device 22 for a short time. If further short term use of the device 22 is desired at a time $t_1$, the switch 26 is closed. Both the diode 25 and the collector-to-emitter current path of the transistor 24 are short-circuited by closure of switch 26, permitting the motor 22 to be driven again with nearly normal speed of rotation, for a short period of time.

Note that the predetermined level of the voltage $V_s$ is adjustable via a variable resistor 35 connected to the IC 30.

Figure 7:
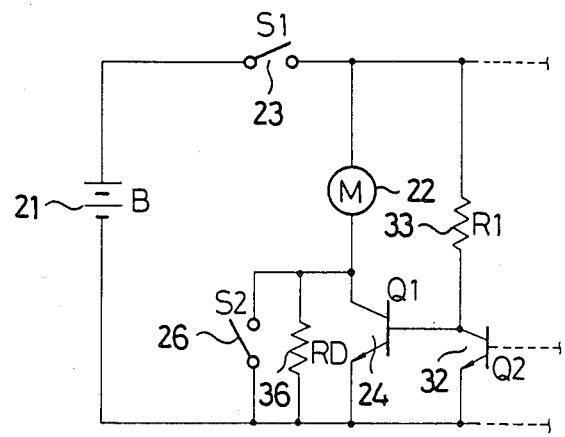
FIG. 7 is an electric circuit diagram showing a relevant part of still another embodiment of the present invention that is a modification of a portion of FIG. 5.
Figure 8:
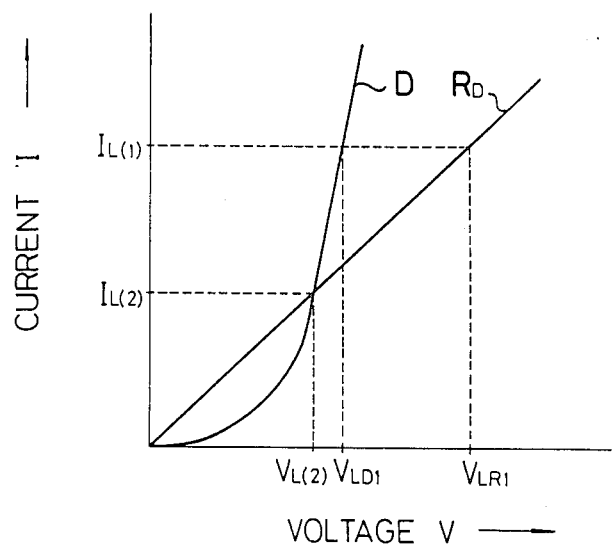
FIG. 8 is a diagram showing the current-voltage characteristics of a diode in FIG. 5 and a resistor in FIG. 7, respectively.

FIG. 7 shows a schematic circuit diagram of a still another embodiment of the present invention. It is different from the circuit of FIG. 5 in that a resistor 36 is substituted for the diode 25 as the voltage dropping element. There is a difference in effect between the diode 25 and the resistor 36, as shown by the current-voltage characteristic diagram of FIG. 8. If a relatively high magnitude of current $I_L(1)$ flows due to loading or changing of the load 22, a large voltage drop $V_{LRl}$ is produced across resistor 36, thereby stopping the motor 22. Such stoppage of the shaver motor 22, in this example, interferes with a user's shaving, and typically occurs if the output voltage of the battery 22 is insufficient for normal operation. In contrast to use of resistor 36, the diode 25 produces an appropriate voltage drop $V_L(2)$ under a stationary load (a current $I_L(2)$ flows and will cause, even when the relatively strong current $I_L(1)$ flows, a voltage drop $V_{LDl}(V_{LDl}<V_{LRl})$ slightly larger than $V_L(2)$, thereby causing only minor changes in the operation of the motor 22. Accordingly, although both the resistor 36 and the diode 25 are available for use as the voltage dropping elements, it is preferable to use diode 25 for the construction of the circuit according to the present invention.

I claim:

1. Apparatus for supplying electric power from a battery having an arbitrary capacity to load, comprising:
   first power supplying means for supplying to said load an amount of power corresponding to a main portion of the power capacity of said battery, whereby the power capacity is divided into said main poriton and a spare portion;
   a supervisory control means for both (1) monitoring the level of power of said battery, and for (2) changing the level of power supplied to the load, when the main portion of the power of said battery is consumed;
   a second power supplying means for supplying the spare portion of power from said battery to the load when the first power supplying means is rendered inoperable;
   said supervisory control means including a detecting means for detecting the moment that the voltage of the battery has decreased to a predetermined level;
   said supervisory control means further including reducing measn for reducing the supply of power to said load in response to said detecting means, when the voltage of the battery has discharged to the predetermined level;
   said reducing means including a first switching means connected in series with the load, and a voltage dropping means connected in parallel with said first switching means; and
   said second power supplying means including a second switching means operable for bypassing said voltage dropping means to directly supply power to said load from said battery.

2. The apparatus according to claim 1, wherein said supervisory control measn includes an interrupting means to interrupt the supply of power to the load via said first power supplying means in response to said detecting means at the moment when the voltage of the battery has decreased to the predetermined level.

3. The apparatus according to claim 4, wherein said interrupting means includes a first switching means connected in series with the load for interrupting the flow of current to said load when the voltage of the battery decreases to the predetermined level.

4. The apparatus according to claim 3, wherein said second power supplying means comprises a second switching means for connecting said battery to the load at times that said first switching means is switched off.

5. The apparatus according to claim 1, wherein said first switching means includes a transistor, said voltage dropping means comprises a diode, and said second switching means comprises a normally-off type switch.

* * * * *